United States Patent [19]
Gaskins

[11] Patent Number: 5,598,083
[45] Date of Patent: Jan. 28, 1997

[54] BATTERY CHANGING SYSTEM FOR ELECTRICALLY POWERED VEHICLE

[75] Inventor: Paul M. Gaskins, Bristol, Tenn.

[73] Assignee: Stamler Corporation, Millersburg, Ky.

[21] Appl. No.: 444,946

[22] Filed: May 19, 1995

[51] Int. Cl.⁶ .............................. H02J 7/00; B62D 25/00
[52] U.S. Cl. .............................. 320/2; 414/458; 414/546; 104/34; 108/65
[58] Field of Search .............................. 320/2; 414/458, 414/546; 104/34; 108/65, 68.5

[56] References Cited

U.S. PATENT DOCUMENTS

| | | |
|---|---|---|
| 3,327,875 | 6/1965 | Goodacre . |
| 3,799,063 | 3/1974 | Reed .............................. 104/34 X |
| 3,834,563 | 9/1974 | Teti .............................. 180/68.5 X |
| 4,397,365 | 8/1983 | Harbe et al. .............................. 180/68.5 |
| 4,824,155 | 4/1989 | Jacobsen . |
| 5,163,537 | 11/1992 | Radev .............................. 180/68.5 X |
| 5,275,525 | 1/1994 | Grumblatt .............................. 180/68.5 X |
| 5,305,513 | 4/1994 | Lucid et al. .............................. 180/68.5 |

*Primary Examiner*—Peter S. Wong
*Assistant Examiner*—K. Shin
*Attorney, Agent, or Firm*—King and Schickli

[57] ABSTRACT

A battery changing system is provided for an electrically powered vehicle. The battery changing system includes a housing for the battery. The housing includes first and second spaced crossbars. A battery manipulating mechanism is mounted to the vehicle. This battery manipulating mechanism includes at least one outwardly projecting arm that is pivotally connected to the vehicle and driven by an actuator so as to raise and lower the battery. More specifically, the arm includes an upwardly directed recess for engaging the first crossbar on the battery housing and a downwardly directed saddle for receiving the second crossbar of the battery housing. A locking plate may be selectively extended to secure the second crossbar in the saddle.

12 Claims, 4 Drawing Sheets

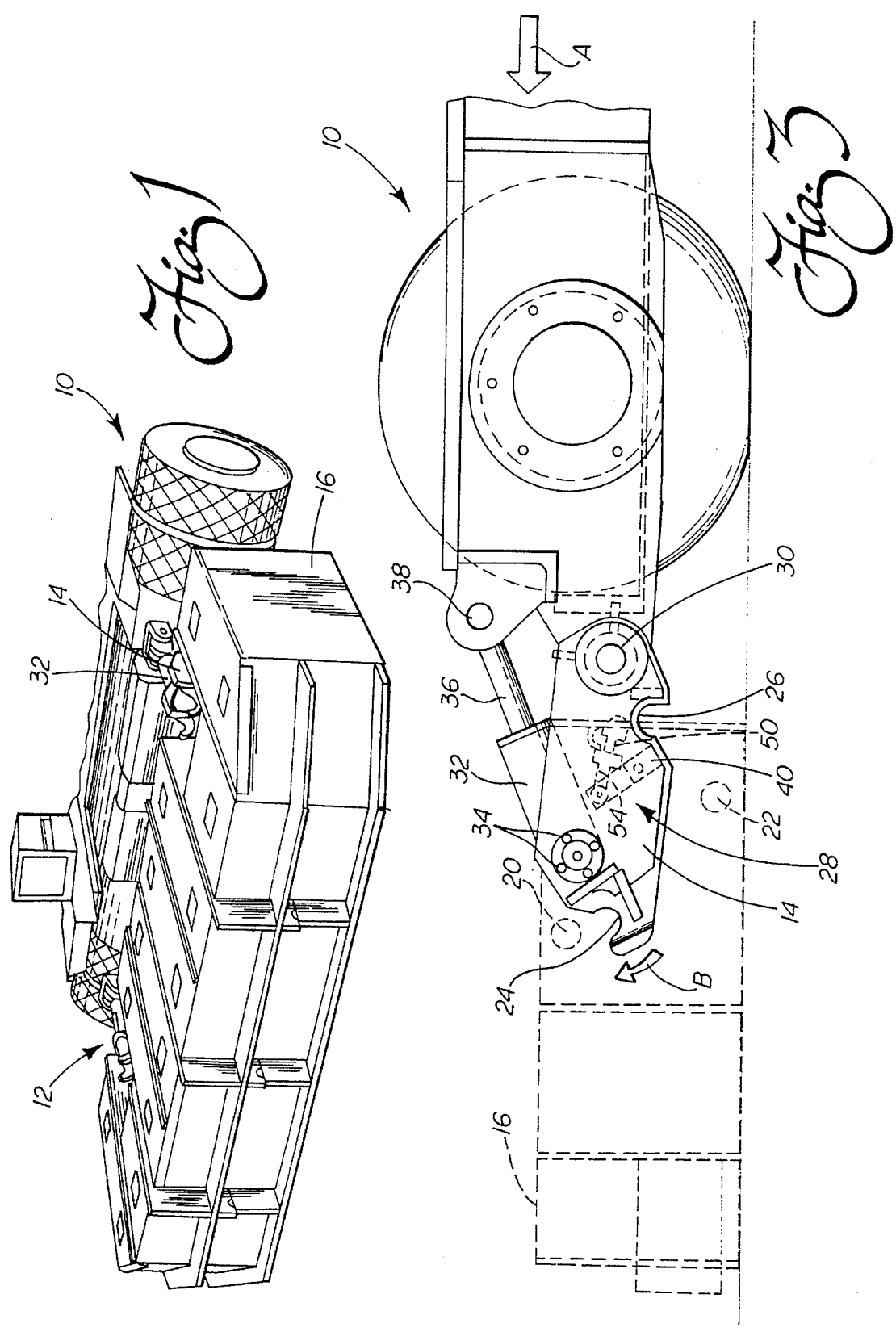

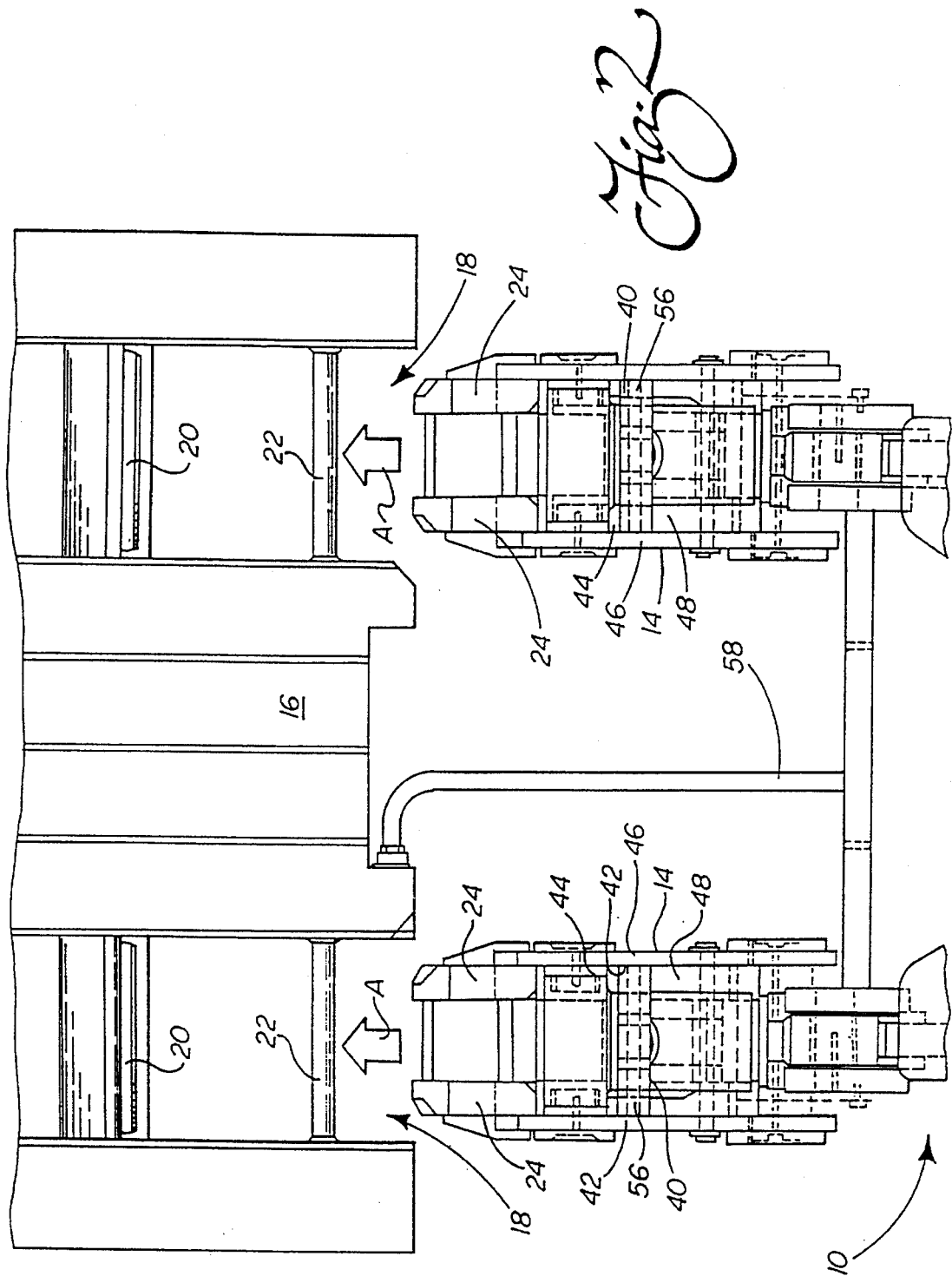

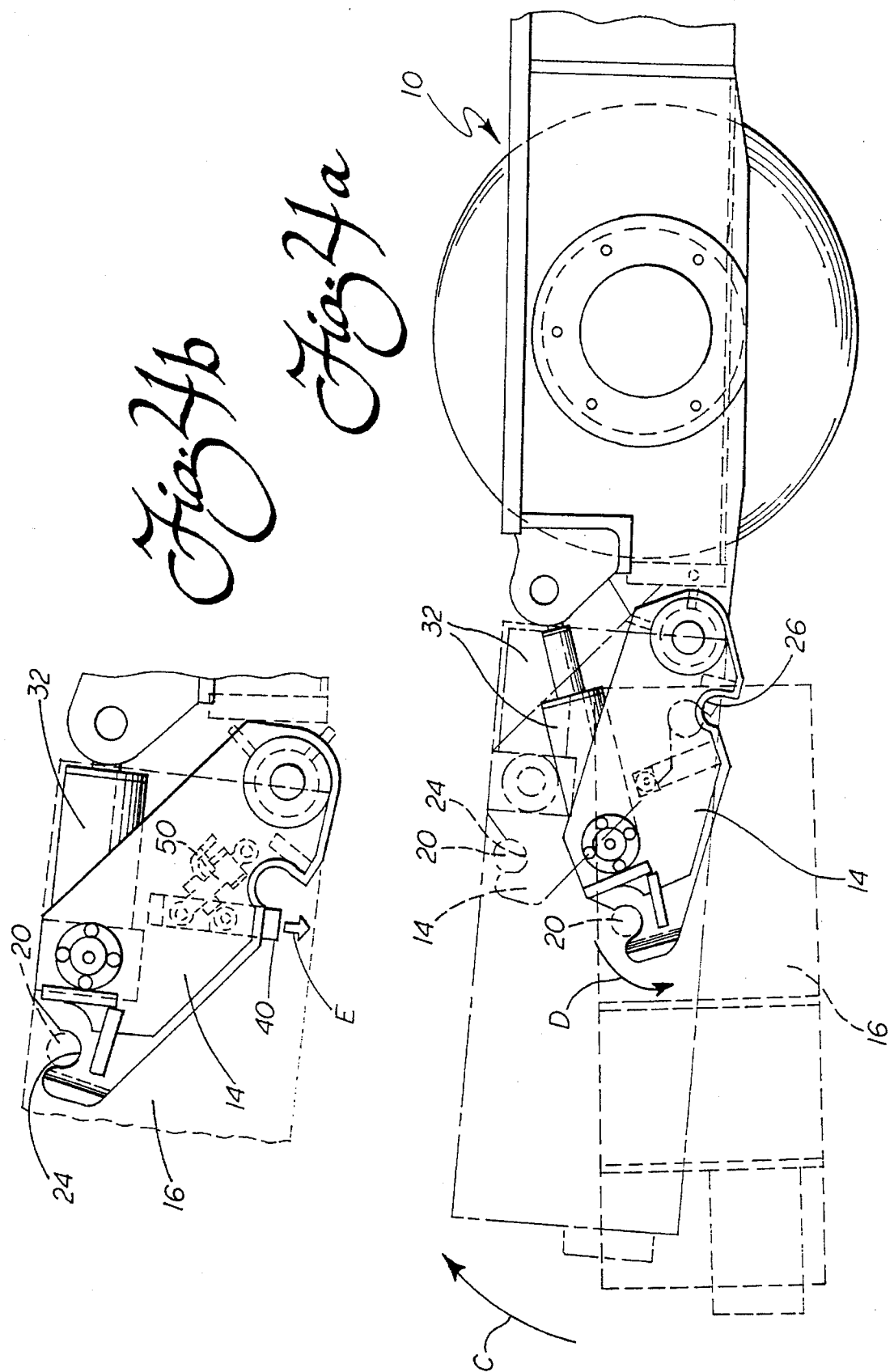

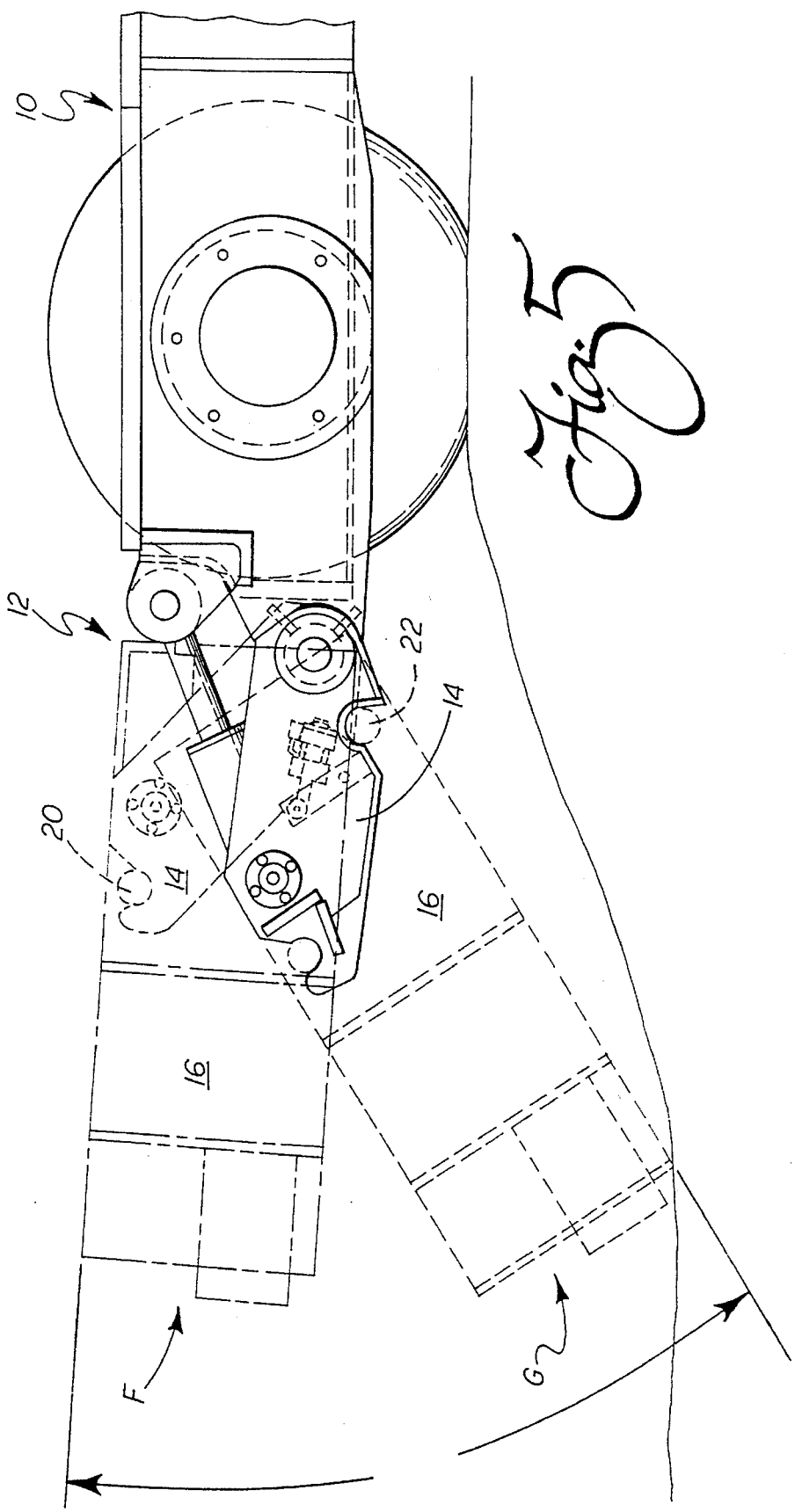

5,598,083

BATTERY CHANGING SYSTEM FOR ELECTRICALLY POWERED VEHICLE

TECHNICAL FIELD

The present invention relates generally to the field of electrically powered vehicles and, more particularly, to a battery changing system for such vehicles.

BACKGROUND OF THE INVENTION

Electrically powered vehicles are well known in the art. They are, for example, commonly employed in conventional underground mining operations. The electrical power for such vehicles is almost universally provided by means of storage batteries. In many situations, a storage battery is mounted directly to and carried by the vehicle which receives the electrical power from the battery.

After a period of use, the battery on the vehicle becomes drained of energy and must be replaced with a charged battery. This requires the switching of a spent battery for a charged battery at a designated battery changing station. As the batteries include many cells to store and furnish the power required to drive the vehicle, they are bulky, cumbersome and heavy, thereby making efficient and effective battery handling a difficult proposition.

Many battery changers have been developed for this exclusive purpose. Several examples of battery changers are disclosed in, for example, U.S. Pat. Nos. 3,799,063 to Reed; 3,834,563 to Teti; 5,275,525 to Grumblatt; and 5,305,513 to Lucid et al. While all these prior art battery changing devices effectively function for their intended purpose, further improvements in the ease, efficiency, reliability and flexibility of operation are desired.

SUMMARY OF THE INVENTION

Accordingly, it is a primary object of the present invention to provide a battery changing system for an electrically powered vehicle providing reliable operation over an extended service life.

Still another, more specific object of the present invention is to provide a battery changing system with relatively greater flexibility of operation conveniently allowing the battery to be lifted and carried above or below level to provide the necessary clearance and weight distribution to allow the best possible vehicle performance under substantially all anticipatable operating conditions.

Still another object of the present invention is to provide a battery changing system that readily allows the battery to be released below, at or above level grade as may be found necessary at a battery changing station in, for example, an underground mine.

Yet an additional object of the present invention is to provide a battery changing system wherein the battery housing includes a channel or pocket with cross bar engagements that may be engaged by lifting arms mounted for movement or displacement relative to the electrically powered vehicle. Advantageously, this arrangement allows the lift system to be placed "in line" with the longitudinal strength members of the vehicle frame so as to provide a higher structural integrity and a sturdier vehicle better able to withstand harsh operating conditions as commonly found in underground mines or other difficult work environments.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a battery changing system is provided for an electrically powered vehicle. The battery changing system comprises a housing for the battery including first and second spaced engagement means. Preferably, the first and second spaced engagement means are first and second spaced crossbars that bridge a channel formed in the housing.

The battery changing system also includes a battery manipulating means mounted to the vehicle for raising and lowering the battery as desired by the vehicle operator. The battery manipulating means includes means for engaging the first and second crossbars on the battery housing. Additionally, the battery changing system includes means mounted to the battery manipulating means or the battery housing for locking together the engaging means on the battery manipulating means and the second, spaced crossbar on the battery housing.

More specifically describing the invention, the battery manipulating means includes an outwardly projecting arm having a proximal end and a distal end. The arm is pivotally connected to the vehicle adjacent to the proximal end. A recess is provided in the arm adjacent the distal end. This recess functions to receive the first crossbar. The arm also includes a saddle positioned closer to the proximal end than the distal end of the arm. This saddle is adapted to receive the second crossbar. The recess and saddle each have entry ways opening in substantially opposite directions.

The battery manipulating means further includes an actuator, such as a hydraulic cylinder, that is pivotally connected between the vehicle and the arm at a position closer to the distal end then the proximal end. By operating this actuator, the arm may be pivotally raised and lowered relative to the vehicle so as to raise and lower the battery housing and the battery held therein.

The locking means, mounted to the arm, includes a locking plate and a locking actuator such as a hydraulic or pneumatic cylinder. As should be appreciated the locking plate is selectively displaceable across at least a portion of the entry-way to the saddle and may be used to lock the battery housing and, therefore, the battery in position on the arm so that it may be securely carried during vehicle operation.

As a result of the unique structural arrangement of the engagement crossbars within a channel formed in the battery housing and the geometrical arrangement of the cooperating recess and saddle in conjunction with the geometric arrangement of the actuator and the lift arm, the battery may be carried below, at or above level. Thus, the battery may be positioned to allow better under clearance or a larger approach angle or, alternatively, a better over clearance at the leading edge of the battery. Such selective positioning can allow significant advantages when operating, for example, a mining vehicle in close underground work areas. Additionally, by placing a lifting arm in line with the left and right longitudinal frame members of the vehicle and positioning cooperating first and second engagement crossbars and cooperating spaced channels in the battery housing, it is possible to align the entire battery changing system with the strongest structural components of the vehicle frame. Thus, during the handling of heavy batteries, no twisting or shearing forces are placed on these frame members and the entire structural integrity of the vehicle is improved at all times.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 1 is a fragmentary perspective view of an electrically powered underground mining vehicle known as a tractor-trailer equipped with a battery changing system of the present invention;

FIG. 2 is a detailed top plan view of the vehicle showing the battery changing system with the battery housing and battery separated from the vehicle but with the power line connected;

FIG. 3 is a partially schematic, and side elevational view showing one lift arm of the battery changing system of the present invention lowered in preparation to engage and lift the battery housing;

FIG. 4a is a view similar to FIG. 3 but showing the recess of the lift arm engaging the first engagement crossbar of the battery housing resulting in the lifting and pivoting of the battery housing;

FIG. 4b is a detailed view similar to FIG. 4a but showing the action of the locking mechanism with the extended locking plate capturing the crossbar in the saddle; and FIG. 5 is a view similar to FIGS. 3 and 4a showing the full range of movement of the battery housing on the lift arm.

Reference will now be made in detail to the present preferred embodiment of the invention, an example of which is illustrated in the accompanying drawing.

DETAILED DESCRIPTION OF THE INVENTION

Reference is now made to FIG. 1 showing an electrically powered mining vehicle 10 of the tractor-trailer type, incorporating the battery changing system 12 of the present invention. It should be appreciated that this mining vehicle 10 is an example of only one type of electrically powered vehicle that could be equipped with the battery changing system 12 of the present invention. This showing is for purposes of illustration only and the invention is not to be considered as limited to this particular application.

As best shown in FIGS. 1 and 2, the battery changing system 12 preferably incorporates a pair of lift arms 14 that may be utilized to selectively lift and lower a battery housing 16 containing a battery comprising a number of heavy cells for storing energy and powering the vehicle 10. As shown the battery housing 16 includes a pair of spaced, cooperating channels 18. First and second engagement means, in the form of crossbars 20, 22 bridge each of these channels 18.

As will become more apparent as the description hereof proceeds, each lift arm 14 includes a recess 24 adjacent to its distal end for engaging one of the first crossbars 20 and a saddle 26 relatively closer to and substantially adjacent to the proximal end of the lift arm for engaging one of the second crossbars 22. Specifically, in operation the first crossbars 20 of the battery housing 16 are initially engaged so as to nest within the recesses 24 of the twin lift arms 14. As the lift arms 14 are raised, the center of gravity of the battery housing 16 causes the housing to pivot until the second crossbars 22 are received and nest within the twin saddles 26. A locking mechanism 28 may then be activated to secure the battery housing in position on the lift arms 14.

Each lift arm 14 will now be described in greater detail. More specifically, as best shown in FIG. 2, each arm 14 is pivotally connected to the vehicle 10 by means of a trunnion 30 adjacent to the proximal end of the arm. An actuator, in the form of a hydraulic cylinder 32 is provided to move the arm relative to the frame of the vehicle 10. More specifically as shown, the cylinder 32 is fixed to the arm 14 by means of fastening elements 34 such as nuts and bolts. The distal end of the cylinder rod 36 is pivotally mounted to the frame of the vehicle 10 by means of a trunnion 38. Thus, as the cylinder rod 36 is extended, the arm 14 pivots downwardly about the trunnion 30. The pivotal connection of the distal end of the cylinder rod 36 to the vehicle 10 at the trunnion 38 accommodates this movement. In contrast, as the cylinder rod 32 is retracted, the arm 14 pivots upwardly about the trunnion 30. Again, the pivotal connection of the cylinder rod 36 at the trunnion 38 accommodates this movement.

As should further be appreciated from reviewing the drawing figures, each arm 14 carries a locking mechanism 28. Specifically, the locking mechanism 28 comprises a locking plate 40. Locking plate 40 is received for sliding movement relative to the arm 14. More specifically, the plate 40 is received in opposing end channels 42 formed by the structural members 44, 46, and 48 of the arm 14.

An actuator 50, such as a hydraulic or pneumatic cylinder, provides for relative movement of the plate 40 on the arm 14. More particularly, the cylinder 50 is fixed to the arm 14 by means of appropriate fasteners (not shown). The cylinder rod 54 of the cylinder 50 is pivotally connected at its distal end by means of a shaft or pin 56 that also passes through cooperating apertures in the plate 40. Thus, it should be appreciated that the cylinder rod 54 is extended to raise the plate 40 and open the entryway leading to the cooperating saddle 26. In contrast, the cylinder rod 54 is retracted into the cylinder 50 to extend the plate 40 downwardly and partially close the entryway leading to the saddle 26. With either movement, the plate 40 is guided by means of its sliding engagement in the opposed cooperating channels 42 and that sliding movement is accommodated by the pivotal connection of the distal end of the cylinder rod 54 to the plate 50 by means of the shaft 56.

The operation of the battery changing system 12 of the present invention will now be described in detail. As shown in FIG. 2, the power cable 58 leading from the battery and battery housing 16 is initially connected between the battery and vehicle 10 to provide operating power to the vehicle. With the lift arms 14 aligned with the channels 18 formed in the battery housing 16, the lift arms 14 are lowered so that the distal ends thereof and, particularly, the recesses 24 are positioned above and clear the second crossbars 22 but are also below the first crossbars 20. The vehicle 10 is then advanced ever so slowly toward the battery housing 16 and the lift arms 14 are raised through operation of the cylinders 32 until the first crossbars 20 nest securely in the recesses 24 of the lift arms (note action arrows A and B in FIGS. 2 and 3).

As the lift arms 14 are raised further by means of the cylinders 32, the end of the battery housing 16 adjacent the vehicle 10 is lifted from the ground. Eventually, the entire battery housing 16 is lifted from the ground. As this occurs, the center of gravity G of the battery housing 16 causes the battery housing to pivot (note action arrow C and D in FIG. 4*a*) about the first crossbars 20 held in the recesses 24. This pivoting action continues until the second crossbars 22 are received and nest into the saddles 26. It should be noted that the entryways of the recesses 24 and the saddles 26 open in substantially opposite directions to allow for this movement. Further, it should be noted that the locking plates 20 are in the fully retracted and unlocked position in order to allow the second crossbars 22 to enter the saddles 26 unimpeded.

Once the second crossbars 22 are fully nested in the saddles 26, the locking mechanism 28 is actuated. More specifically, the cylinders 50 are operated to retract the cylinder rods 54 and thereby extend the plates 40 partially across the entryway leading to the saddles 26 (note action arrow E in FIG. 4*b*). This functions to capture the second crossbars 22 in the saddles 26 and thereby secure the battery housing 16 on the lift arms 14.

As a result of the unique structural arrangement of the present invention, a number of significant advantages are achieved. First it should be noted that the relative geometry of the lift arms 14 and actuating cylinders 32 allows the battery housing 16 to not only be carried level but also above level when necessary to obtain better under clearance or a larger approach angle (note FIG. 5, position F). This is often necessary in order to provide smooth vehicle operation, particularly in the underground mining environment where sudden rises in the mine floor are encountered as a result of undulations in the underlying strata or for other reasons. Specifically, the larger approach angle and ground clearance will often reduce or eliminate vehicle "bottoming" thereby providing a smoother ride and allowing more efficient vehicle operation. Thus, it is also possible to reduce, haulage losses that might otherwise result due to jarring ground engaging impacts causing quantities of aggregate coal to fall from the mining vehicle during the hauling operation.

It should also be appreciated that the arms 14 may be manipulated to tilt the battery housing 16 below level (note FIG. 5, position G). This allows the individual to obtain better over clearance at the leading edge of the battery housing. This, of course, is also a significant benefit in underground mining operations where low seam heights might otherwise impede the operation of mining vehicles not equipped with this feature.

It should also be noted that the lift arms 14 may be positioned substantially inline with the left and right side longitudinal frame members of the mining vehicle 10. Further, the channels 18 in the battery housing 16 are similarly spaced. As a result, the entire battery handling system 12 is positioned where both the weight of the system and the weight of the batteries may be better supported by the vehicle frame without placing undue stress in twisting and shear forces thereon. Thus, the structural integrity of the vehicle 10 is better preserved over a long service life.

It should further be appreciated that the locking mechanism 28 of the battery changing system 12 is sufficiently strong to withstand the weight of the vehicle 10. Thus, if the battery housing 16 is lowered to allow the leading bottom edge of the battery housing to contact the ground, the locking plates 40 withstand the force required to lift the front wheels of the vehicle 10 from the ground, thereby, pivoting on the edge of the battery housing. As a result, the battery changing system 12 of the present invention even allows one to tilt the vehicle 10 rearwardly when desired as an aide in unloading and loading aggregate material if a benefit to vehicle operation.

Of course, after a certain period of time, such as at the end of a work shift, the battery must be changed. At that time the vehicle 10 is driven to the battery changing station. Once the vehicle 10 is properly positioned, cylinders 50 of the locking mechanism 28 are actuated and the cylinder rods 54 are extended. This causes the plates 40 to retract and open the entryways to the saddles 26. Next the lift arms 14 are lowered. As this is done, the leading edge of the battery housing 16 furthest from the vehicle 10 engages the ground. With further lowering of the lift arms 14, the battery housing 16 pivots about the first crossbars 20 held in the recesses 24 and the second crossbars 22 pass through the entry-ways and leave the saddles 26. Once the battery housing 16 is fully resting on the ground, the lift arms 14 are lowered slightly to provide clearance to allow the passage of the distal ends of the lift arms beneath the first crossbars 20. The vehicle 10 may then be backed away slightly from the battery housing 16 and the power cable 58 may then be disconnected. The vehicle 10 is then ready for reconnecting to a new battery in the manner previously described.

In summary, numerous benefits result from employing the concepts of the present invention. As described, the battery changing system allows for a flexibility and range of movement not previously available in other battery changer system designs. Either under clearance and a larger approach angle may be provided to prevent or alleviate bottoming or greater over clearance may be provided to allow operating in lower height seams. The positioning of the battery housing is selected to allow best vehicle operation. In fact, the range of motion provided with the battery changing system of the present invention allows the battery housing 16 to be released at, below, or above level grade. This is a particularly important and convenient feature in an underground mining vehicle.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the locking mechanism 28 could be positioned on the battery housing 16 if desired.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A battery changing system for an electrically powered vehicle, comprising:

a housing for a battery including first and second spaced engagement points;

a battery manipulating arm mounted to the vehicle for raising and lowering said battery, said battery manipulating arm including means for engaging said first and second engagement points on said battery housing, a recess for receiving said first engagement point and a saddle for receiving said second engagement point, said recess and said saddle having entryways opening in substantially opposite directions; and means mounted to one of said battery manipulating arm and said battery housing for locking together said engaging means on said battery manipulating arm and said second, spaced engagement point on said battery housing.

2. The battery changing system set forth in claim 1, wherein said first and second spaced engagement points comprise first and second spaced crossbars.

3. The battery changing system set forth in claim 2, wherein said first and second spaced crossbars bridge a channel formed in said housing.

4. The battery changing system set forth in claim 3, wherein said battery manipulating arms includes a proximal end and a distal end, said arm being pivotally connected to said vehicle adjacent said proximal end.

5. The battery changing system set forth in claim 4, wherein said recess is adjacent said distal end and said saddle is relatively closer to said proximal end of said battery manipulating arm.

6. The battery changing system set forth in claim 1, wherein said battery manipulating arm further includes an actuator pivotally connected between the vehicle and said arm closer to said distal end than said proximal end.

7. The battery changing system set forth in claim 6, wherein said locking means comprises a locking plate and a locking plate actuator, said locking plate being selectively displaceable across at least a portion of said entryway to said saddle.

8. An electrically powered vehicle incorporating the battery changing system set forth in claim 1.

9. An electrically powered vehicle incorporating the battery changing system set forth in claim 4.

10. An electrically powered vehicle incorporating the battery changing system set forth in claim 7.

11. An electrically powered vehicle incorporating the battery changing system set forth in claim 2.

12. An electrically powered vehicle incorporating the battery changing system set forth in claim 3.

* * * * *